(12) United States Patent
Trim et al.

(10) Patent No.: US 11,157,874 B2
(45) Date of Patent: Oct. 26, 2021

(54) HIERARCHY DEFINITION AND ANALYSIS FOR REQUIREMENT DOCUMENTATION

(71) Applicant: International Business Machines Corporation, Armonk, NY (US)

(72) Inventors: Craig M. Trim, Sylmar, CA (US); Victor Povar, Vancouver (CA); Gandhi Sivakumar, Victoria (AU); Lynn Kwok, Victoria (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 632 days.

(21) Appl. No.: 15/967,557

(22) Filed: Apr. 30, 2018

(65) Prior Publication Data
US 2019/0333019 A1    Oct. 31, 2019

(51) Int. Cl.
*G06Q 10/10* (2012.01)
*G06N 20/00* (2019.01)
*G06F 16/93* (2019.01)

(52) U.S. Cl.
CPC .......... *G06Q 10/101* (2013.01); *G06N 20/00* (2019.01); *G06F 16/93* (2019.01)

(58) Field of Classification Search
None
See application file for complete search history.

(56) References Cited

U.S. PATENT DOCUMENTS

| | | | |
|---|---|---|---|
| 5,918,207 A | 6/1999 | McGovern et al. | |
| 6,249,769 B1 | 6/2001 | Ruffin et al. | |
| 7,035,809 B2 | 4/2006 | Miller et al. | |
| 8,191,044 B1 | 5/2012 | Berlik et al. | |
| 2005/0171833 A1 | 8/2005 | Jost et al. | |
| 2007/0266377 A1 | 11/2007 | Ivanov | |
| 2009/0007056 A1* | 1/2009 | Prigge | G06Q 10/10 717/104 |
| 2009/0089078 A1 | 4/2009 | Bursey | |

(Continued)

FOREIGN PATENT DOCUMENTS

CN        101266661 A      9/2008

OTHER PUBLICATIONS

A review of machine learning algorithms for identification and classification of non-functional requirements, Binkhonain et al., School of computer science, University of Manchester, UK, 2019) (Year: 2019).*

*Primary Examiner* — Dennis W Ruhl
(74) *Attorney, Agent, or Firm* — Garg Law Firm, PLLC; Rakesh Garg; Alexander Jochym

(57) ABSTRACT

A requirement process document is received. The requirement process document specifies a plurality of requirements for developing a product. Each of the plurality of requirements is classified, using machine learning, as either a business requirement or a technical requirement. A hierarchy including a plurality of levels of business requirements and technical requirements is determined from the requirement process document. A particular level in the hierarchy for each of the business requirements and technical requirements and one or more relationships between the business requirement and the technical requirement within the hierarchy is identified. A realizing component and associated capability for implementing one or more of the technical requirements is identified.

18 Claims, 5 Drawing Sheets

(56) References Cited

U.S. PATENT DOCUMENTS

| | | | |
|---|---|---|---|
| 2011/0119194 A1* | 5/2011 | McLees | G06Q 10/067 |
| | | | 705/301 |
| 2012/0030198 A1 | 2/2012 | Beck et al. | |
| 2012/0197681 A1 | 8/2012 | Marrelli et al. | |
| 2013/0254737 A1* | 9/2013 | Lal | G06Q 10/06 |
| | | | 717/101 |
| 2017/0220323 A1* | 8/2017 | Dsouza | G06F 8/20 |
| 2018/0189690 A1* | 7/2018 | Chan | G06F 11/3688 |

\* cited by examiner

HIERARCHY DEFINITION AND ANALYSIS FOR REQUIREMENT DOCUMENTATION

TECHNICAL FIELD

The present invention relates to a method, system, and computer program product for the analysis of requirement documentation. More particularly, the present invention relates to a method, system, and computer program product for hierarchy definition and analysis for requirement documentation.

BACKGROUND

Development of products, such as during software or system engineering, involves (1) analyzing one or more documents which specify process/business requirements and technical requirements of the product and (2) determining the resources that need to be utilized to develop the product according to the requirements. A requirement states a capability and/or attribute that is necessary and desired to be present in the product. The process/business requirements specify the processes or methodologies required to be used during development, delivery, and the functional needs to be satisfied by the product. Business/process requirements are often developed by business analysts based on input from employees, customers, vendors, or other entities during the analysis and design phase of the product development life cycle. Technical requirements pertain to the technical aspects that the product must fulfill such as compliance, performance and reliability.

SUMMARY

The illustrative embodiments provide a method, system, and computer program product. An embodiment of a method includes receiving a requirement process document. In the embodiment, the requirement process document specifies a plurality of requirements for developing a product. The embodiment further includes classifying, using machine learning, each of the plurality of requirements as either a business requirement or a technical requirement. The embodiment further includes determining a hierarchy including a plurality of levels of business requirements and technical requirements from the requirement process document. The embodiment further includes identifying a particular level in the hierarchy for each of the business requirements and technical requirements and one or more relationships between the business requirement and the technical requirement within the hierarchy. The embodiment further includes identifying a realizing component and associated capability for implementing one or more of the technical requirements.

Another embodiment further includes determining that a match is identified between the identified realizing component and an available component indicated by ground truth information. Another embodiment further includes providing end-to-end traceability through the hierarchy between the realizing component and capability, businesses requirements and technical requirements that are realized by the realizing component and capability.

Another embodiment further includes determining that a match is not identified between the identified realizing component and an available component indicated by ground truth information. Another embodiment further includes identifying the identified realizing component as a missing realizing component and capability.

Another embodiment further includes determining that a particular level of a business requirement or a technical requirement in the hierarchy matches an expected level in a ground truth requirements map. Another embodiment further includes highlighting the particular level as matching the expected level in a graphical user interface.

Another embodiment further includes determining that a particular level of a business requirement or a technical requirement in the hierarchy does not match an expected level in a ground truth requirements map. Another embodiment further includes identifying the particular level as a missing business requirement or technical requirement.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
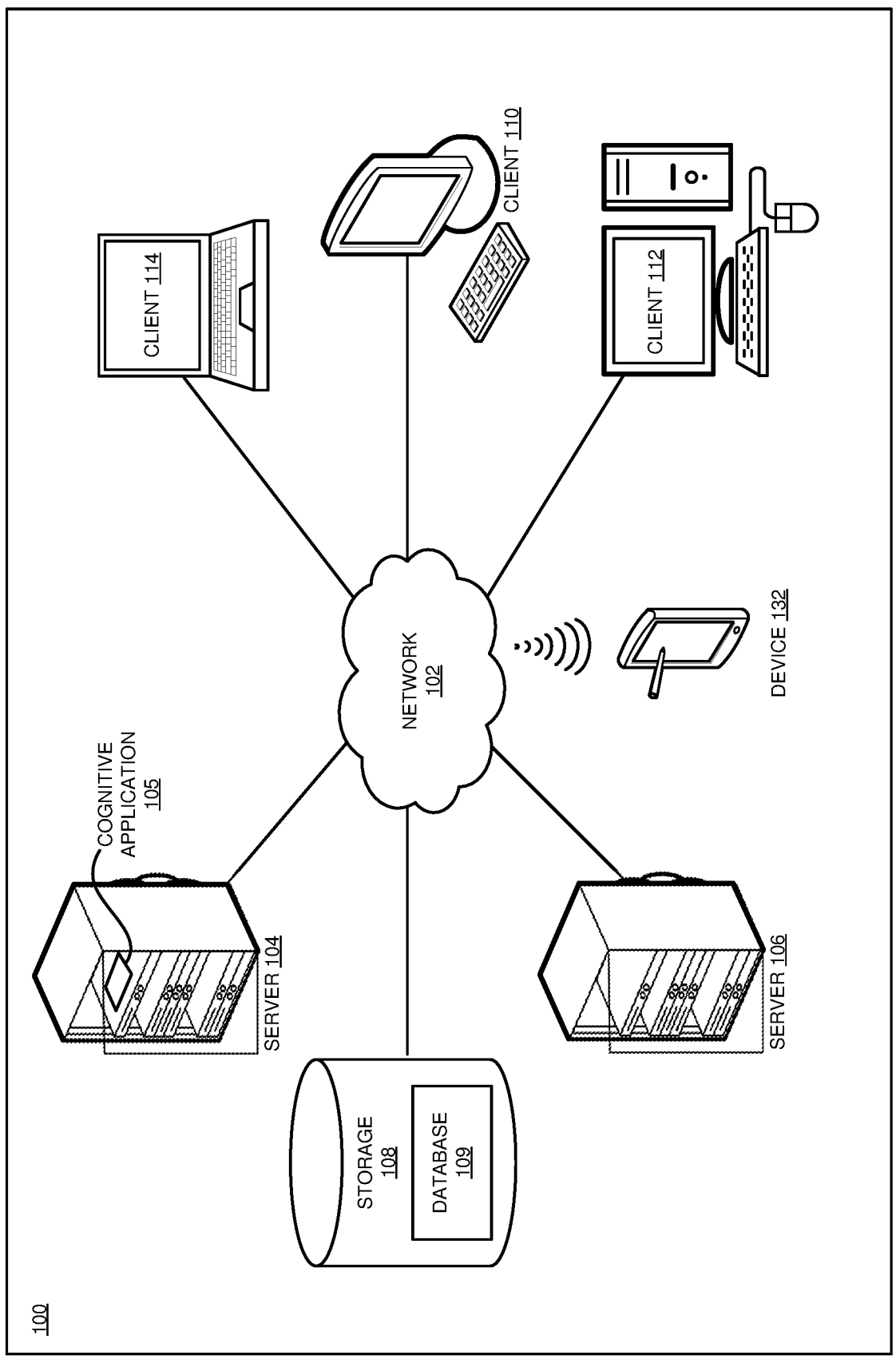
FIG. 1 depicts a block diagram of a network of data processing systems in which illustrative embodiments may be implemented.

The illustrative embodiments described herein relate to hierarchy definition and analysis for requirement documentation. Artificial intelligence (AI) systems are evolving to solve a variety of problems in industry including analyzing process/business requirements for product development. During analysis of business/process requirements, the business/process requirements are decomposed into technical requirements. The technical requirements are in-turn translated to a bill of components. The bill of components is a list of resources, materials, and/or components required to develop or manufacture the product. Each process/business requirement may have multiple types of relationships to one or more technical requirements. Thus, process/business requirements have a hierarchical structure in relation to the technical requirements.

Various types of AI systems exist today ranging from semantic matching to deep parser based understanding and matching. Existing AI systems are not sufficient for requirements based solutions since requirements may be factored to lower levels which may not have semantic or syntactic relationships to each other, or requirements may be factored to lower levels which have no neural dependencies between each other. Thus, there is a need for pure relationship based AI pipelines to address the above limitations such as by using one or more of the embodiments described herein. Various embodiments described herein address the current limitations of syntactic, semantic, pattern based and neural dependency based pipelines for requirement hierarchy definition and analysis.

Various embodiments described herein provide for a cognitive system for identifying and analyze a hierarchy of requirements using one or more of concepts, levels, relationships and classifications across semantically unrelated entities found in one or more requirements documents. In one or more embodiments, the entities include a business/process requirement to technical requirement translations and/or a technical requirement to business requirement translation.

One or more embodiments described herein enable, for example, a solution architect in an engineering or other field to perform traceability to business requirements from a detailed design not only to identify related requirements but also to highlight missing technical and business requirements. Requirements traceability refers to relationships determination among entities of a development process, high-level requirements, such as business requirements, and the low-level requirements, such as technical requirements.

In an embodiment, a trainer, such as a solutions architect trainer, creates ground truth (GT) maps as a dataset for training a cognitive application to map requirements specified in a requirements document to a requirements hierarchy. In the embodiment, the GT map is a collection of information vetted by subject matter experts (SMEs) and represents the reality of the hierarchical relationships between business requirements and technical requirements. Therefore, the cognitive application is trained for determining the requirement hierarchical relationship.

In an embodiment, the cognitive application receives a requirements document, classifies requirements in the requirements document, and maps business requirements and technical requirements to a hierarchy. In the embodiment, the cognitive application further determines whether identified requirements match a level in a ground truth requirements map, and highlights non-matching requirements for intervention and additional training by a subject matter expert. In the embodiment, the cognitive application also identifies developing components for each technical requirement, and provides an end-to-end traceability for each technical requirement.

In one or more embodiments, a graphical user interface (GUI) is provided to display the hierarchy definition and analysis results. One or more embodiments provide for the ability to specify a hierarchy of a corpus categorized for processing requirements, and to subsume the corpus at various levels of the hierarchy. One or more embodiments provide for the ability to provide a "ground truth" definition for determining the hierarchy of requirements in which such requirements have a spectrum of elements determined with concept matching, classification, neural matching or completely unrelated matching.

One or more embodiments provide for a one-to-one ground truth mapping of business and technical requirements across the hierarchy such as factoring an abstract requirement process of "Manage Customer Address" to lower requirements based on machine learning semantic processing such as by determining, a verb, object, subject, etc. of a requirements document.

One or more embodiments provide for the ability to define an explicit hierarchy of ground truth for processing requirements such as specifying that Level 4 can always only be reached through Levels 2 and 3 from Level 1. One or more embodiments provide for the ability to define self-recursive ground truth.

One or more embodiments provide for the ability to subsume an additional corpus, apply existing AI pipelines, identify matches, leverage the ground truth and define a confidence score for a requirement hierarchy. Other embodiments further provide for the ability to align the hierarchy confidence score based on user feedback. One or more embodiments provide for the ability to tag requirements with requirement types along with the hierarchy. An embodiment provides for the ability to define missing intermediary requirements to reflect an explicit ground truth.

In one or more particular embodiments, the cognitive application resides on one or more servers in communication with a client device over a network. In other particular embodiments, the cognitive application resides on the client device.

The illustrative embodiments are described with respect to certain types of cognitive processes, ground truth maps, business and technical requirements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
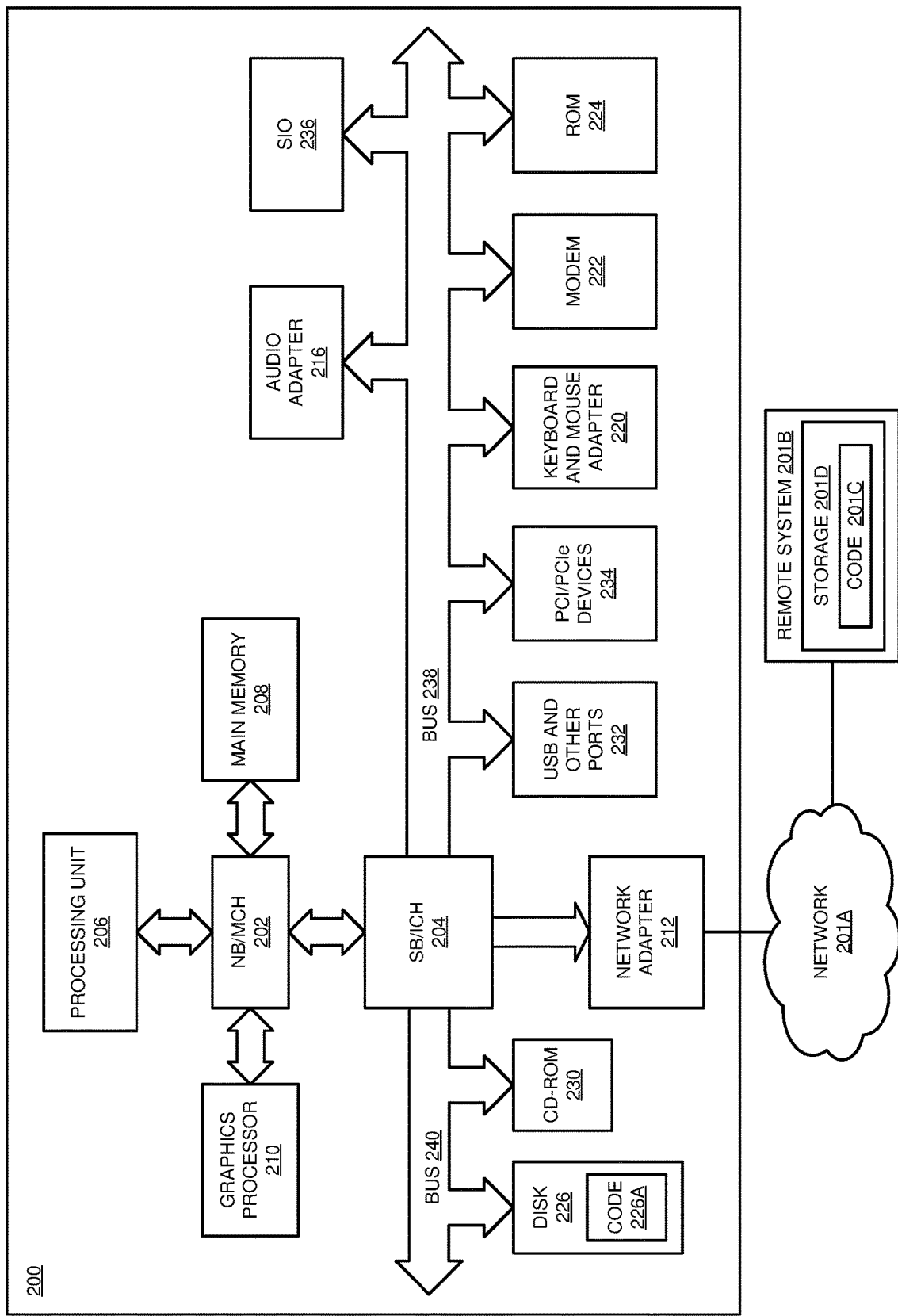
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. In one or more embodiments, storage 108 may be configured to store ground truth maps and/or other cognitive training data within a database 109. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a PDA, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Cognitive application 105 of server 104 implements an embodiment of an algorithm for hierarchy definition and analysis for requirement documentation as described herein. Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein in which computer usable program code or instructions implementing the processes of the illustrative embodiments may be located. Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as cognitive application 105 and document authoring application 107 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
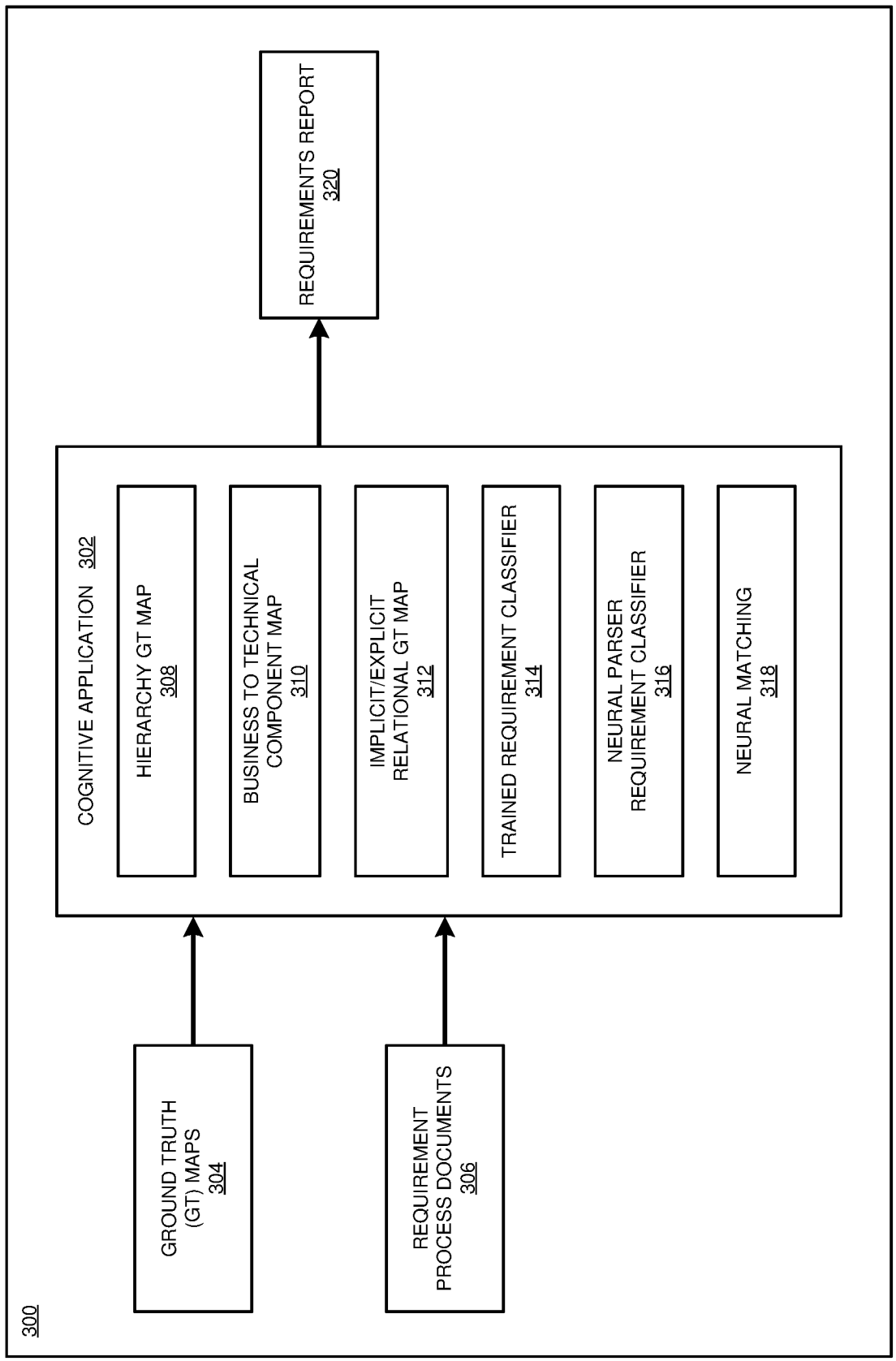
FIG. 3 depicts a block diagram of a cognitive application for hierarchy definition and analysis for requirement documentation in which illustrative embodiments may be implemented.

With respect to FIG. 3, this figure depicts a block diagram 300 of a cognitive application for hierarchy definition and analysis for requirement documentation in which illustrative embodiments may be implemented. Cognitive application 302 implements an embodiment of cognitive application 105 of server 104 for hierarchy definition and analysis for requirement documentation as described herein. In the embodiment, cognitive application 302 receives one or more ground truth (GT) maps 304 and one or more requirement process documents 306. GT maps 304 include ground truth information for training cognitive application 302 to map requirements specified in a requirements document to a requirements hierarchy. Requirements process documents 306 include business requirements and technical requirements specifying a product that is desired to be developed.

Cognitive application 302 includes a hierarchy GT map 308, a business to technical component map 310, an implicit/explicit relational GT map 312, a trained requirement classifier 314, a neural parser requirement classifier 316, and a neural matching component 318. Hierarch GT map 308 is configured to map business requirements and technical requirements extracted from requirements process documents 306 to define a GT map hierarchy indicating relationships between the business requirements and technical requirements using machine-learning techniques as described herein.

Business to technical component map 310 is configured to refine the GT map hierarchy to map one or more business requirements to one or more technical requirements at a number of hierarchical levels to reflect requirements in which technical products have the ability to handle a higher level of process requirements. Implicit/explicit relational GT map component 312 determines both implicit and explicit relationships between the business requirements and technical requirements of the GT map hierarchy.

Trained requirement classifier 314 is configured to parse sentences found within requirement process documents 306 to identify business requirements and technical requirements using one or more trained classifiers. Neural parser requirement classifier 316 is configured to parse requirement process documents 306 to identify business requirements and technical requirements. In particular embodiments, neural parser requirement classifier 316 utilizes neural network parsers defined through neural maps to parse requirement process documents 306 to output neural parser components that are abstractly or concretely mapped to identify a level to which a business or technical requirement matches in the hierarchy. Neural matching component 318 is configured to use existing probabilistic matches to classify business requirements and technical requirements.

Cognitive application 302 may also employ a service oriented architecture where interoperable software components distributed across a network may be packaged together as coherent business applications. Cognitive application 302 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 4:
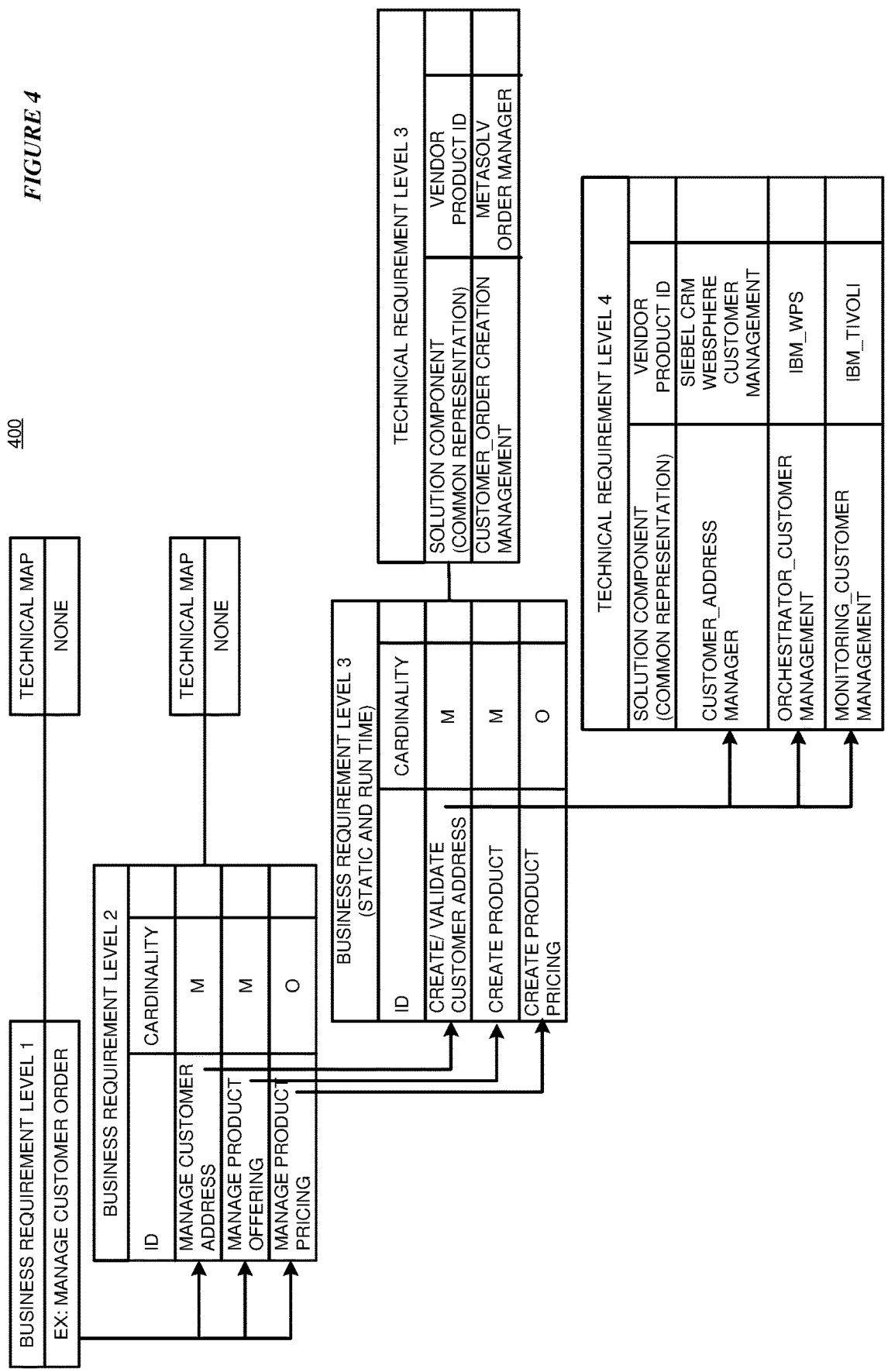
FIG. 4, this figure depicts an example embodiment of a hierarchical ground truth (GT) map definition.

With respect to FIG. 4, this figure depicts an example embodiment of a hierarchical ground truth (GT) map definition 400. In the embodiment, the hierarchical ground truth map definition 400 is constructed by cognitive application 302 from requirement process documents 306. Hierarchical ground truth (GT) map definition 400 includes a first level (level 1) business requirement having corresponding first level technical requirement mapping. In the example of FIG. 4, the first level business requirement is a management of a customer order. The first level business requirement is mapped to multiple second level (level 2) business requirements having no corresponding second level technical requirement mapping. The second level business requirements include managing a customer address (ID=MANAGE CUSTOMER ADDRESS), managing a product offering (ID=MANAGE PRODUCT OFFERING), and managing a product pricing (ID=MANAGE PRODUCT PRICING). The cardinality of each requirement represents whether the requirement is mandatory ("M") or optional ("O"). Each of the second level business requirements is mapped to a third level (level 3) business requirement. The managing a customer address second level business requirement is mapped to a create/validate customer address (ID=CREATE/VALIDATE CUSTOMER ADDRESS)third level business requirement, the manage product offering second level business requirement is mapped to a product creation (ID=CREATE PRODUCT) third level business requirement, and the managing product pricing second level business requirement is mapped to a creating product pricing (ID=CREATE PRODUCT PRICING) third level business requirement.

In the embodiment, the "create/validate customer address" third level business requirement is mapped to a third level (level 3) technical requirement of a solution component "Common Representation" which associates with a vendor product identifier (vendor product ID). In the example of FIG. 4, the third level technical requirement also includes a "customer order create management" component which has a vendor ID associated with MetaSolv Order Management software. The "create/validate customer address" third level business requirement is further mapped to fourth level (level 4) technical requirements having solution components of: (1) a customer address manager (CUSTOMER_ADDRESS_MANAGER) having a vendor ID associated with Siebel CRM Websphere Customer Management software, (2) a customer management orchestrator (ORCHESTRATOR_CUSTOMER_MANAGEMENT) having a vendor ID associated with IBM WebSphere Process Server (WPS), and (3) a customer management monitoring (MONITORING_CUSTOMER_MANAGEMENT) associated with IBM Tivoli monitoring software.

Figure 5:
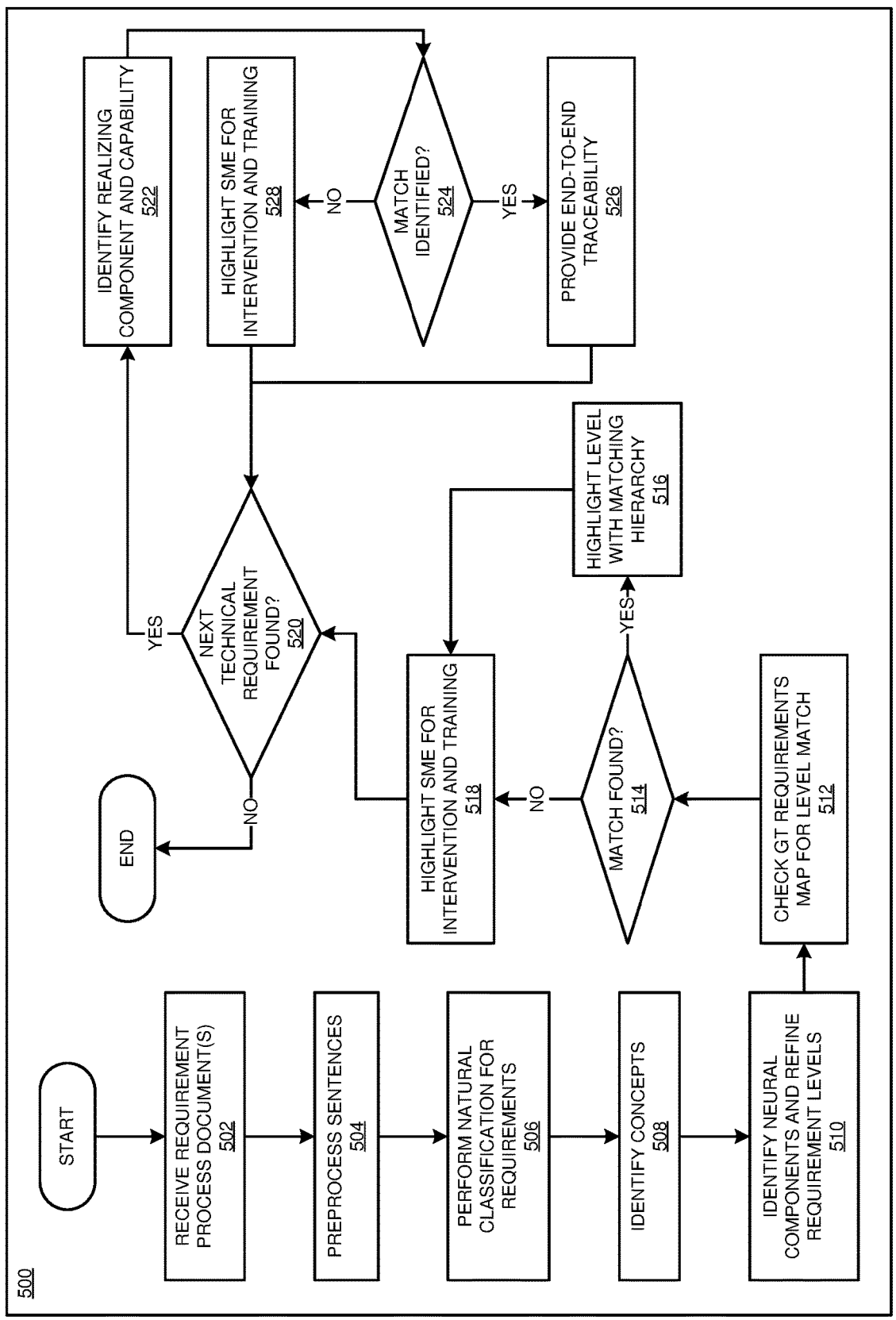
FIG. 5 depicts a flowchart of an example process for hierarchy definition and analysis for requirement documentation in accordance with an illustrative embodiment.

With reference to FIG. 5, this figure depicts a flowchart of an example process for hierarchy definition and analysis for requirement documentation in accordance with an illustrative embodiment. In one or more embodiments, process 500 can be implemented in cognitive application 105 or 302. In other embodiments, process 500 can be implemented in client device 110.

In block 502, cognitive application 105 receives one or more requirement process documents specifying one or more requirements in a textual form for developing a product. In block 504, cognitive application 105 preprocesses one or more sentences within the requirement process documents to prepare the sentences for subsequent topic and context matching operations. In a particular embodiment, cognitive application 105 preprocesses the one or more sentences using existing semantic sentence preprocessing techniques. In block 506, cognitive application 105 performs natural language classification or other machine learning on the preprocessed sentences to determine one or more requirements specified within the requirement process documents. In block 508, cognitive application 105 identifies concepts within the process requirement documents in which the concepts are the determined requirements and the identification includes determining whether a particular determined requirement is a business requirement or a technical requirement.

In block 510, cognitive application 105 identifies neural components of the business requirements and technical requirements and refines the requirement levels to identify a particular level in the hierarchy for a particular business requirement and technical requirement to define a hierarchy of the business requirements and technical requirements as well as a relationship between the business requirement and the technical requirement within the hierarchy. In block 512, cognitive application 105 checks a ground truth (GT) requirements map to determine if levels for the determined business requirements and the technical requirements match the expected levels or other levels of the GT requirements map. In block 514, cognitive application 105 determines if a match is found. If a match is found, in block 516 cognitive application 105 highlights the level with the matching hierarchy and process 500 proceeds to block 518. If no match is found in block 514, process 500 continues to 518. In block 518, cognitive application 105 highlights any missing business requirements and technical requirements for additional intervention and training by a subject matter expert (SME).

In block 520, cognitive application 105 determines whether a next technical requirement among the technical requirements has been found. If no next technical requirement has been found, process 500 ends. If a next technical requirement has been found process 500 continues to block 522. In block 522, cognitive application 105 identifies a realizing component and associated capability for implementing the technical requirement. In particular embodiments, cognitive application 105 uses a component capability to function ground truth map for identifying the realizing component and associated capability in which extracted components and requirements are mapped to requirements from the ground truth map.

In block 524, cognitive application 105 determines if a match is identified between the identified realizing component and an available component indicated by ground truth information. If a match is identified, in block 526, cognitive application 105 provides end-to-end traceability through the hierarchy between the realizing component and capability and businesses and technical requirements realized by the realizing component and capability and process 500 returns to block 520. If no match if identified, in block 528, cognitive application 105 highlights the missing realizing component and capability to an SME for further intervention and training and process 500 returns to block 520. If no further technical requirements are found process 500 is ended thereafter.

Thus, a computer implemented method, system or apparatus, and computer program product are provided in the illustrative embodiments for hierarchy definition and analysis and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving, by a cognitive application, a requirement process document, the requirement process document specifying a plurality of requirements for developing a product;
   classifying, by the cognitive application using machine learning, each of the plurality of requirements using a neural parser trained to identify the requirements as either a business requirement or a technical requirement;
   determining, by the cognitive application, a hierarchy including a plurality of levels of business requirements and technical requirements from the requirement process document based on training of the cognitive application using ground truth information that comprises relationships between business requirements and technical requirements;
   identifying, by the cognitive application, a particular level in the hierarchy for each of the business requirements and technical requirements and one or more relationships between the business requirement and the technical requirement within the hierarchy; and
   identifying, by the cognitive application, a software component and associated capability for implementing one or more of the technical requirements.

2. The method of claim 1, further comprising:
   determining that a match is identified between the identified software component and an available software component indicated by ground truth information.

3. The method of claim 1, further comprising:
   determining that a match is not identified between the identified software component and an available software component indicated by ground truth information.

4. The method of claim 3, further comprising:
   identifying the identified software component as a missing software component and capability.

5. The method of claim 1, further comprising:
   determining that a particular level of a business requirement or a technical requirement in the hierarchy matches an expected level in a ground truth requirements map.

6. The method of claim 5, further comprising:
   highlighting the particular level as matching the expected level in a graphical user interface.

7. The method of claim 1, further comprising:
   determining that a particular level of a business requirement or a technical requirement in the hierarchy does not match an expected level in a ground truth requirements map.

8. The method of claim 7, further comprising:
   identifying the particular level as a missing business requirement or technical requirement.

9. A computer usable program product comprising one or more computer-readable storage devices, and program instructions stored on at least one of the one or more storage devices, the stored program instructions comprising:
   program instructions for a cognitive application to receive a requirement process document, the requirement process document specifying a plurality of requirements for developing a product;
   program instructions for the cognitive application to classify, using machine learning, each of the plurality of requirements using a neural parser trained to identify the requirements as either a business requirement or a technical requirement;
   program instructions for the cognitive application to determine a hierarchy including a plurality of levels of business requirements and technical requirements from the requirement process document based on training of the cognitive application using ground truth information that comprises relationships between business requirements and technical requirements;
   program instructions for the cognitive application to identify a particular level in the hierarchy for each of the business requirements and technical requirements and one or more relationships between the business requirement and the technical requirement within the hierarchy; and program instructions for the cognitive application to identify a software component and associated capability for implementing one or more of the technical requirements.

10. The computer usable program product of claim 9, further comprising:
program instructions to determine that a match is identified between the identified software component and an available software component indicated by ground truth information.

11. The computer usable program product of claim 9, further comprising:
program instructions to determine that a match is not identified between the identified software component and an available software component indicated by ground truth information.

12. The computer usable program product of claim 11, further comprising:
program instructions to identify the identified software component as a missing software component and capability.

13. The computer usable program product of claim 9, further comprising:
program instructions to determine that a particular level of a business requirement or a technical requirement in the hierarchy matches an expected level in a ground truth requirements map.

14. The computer usable program product of claim 13, further comprising:
program instructions to highlight the particular level as matching the expected level in a graphical user interface.

15. The computer usable program product of claim 9, further comprising:
program instructions to determine that a particular level of a business requirement or a technical requirement in the hierarchy does not match an expected level in a ground truth requirements map.

16. The computer usable program product of claim 9, wherein the computer usable code is stored in a computer readable storage device in a data processing system, and wherein the computer usable code is transferred over a network from a remote data processing system.

17. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions for a cognitive application to receive a requirement process document, the requirement process document specifying a plurality of requirements for developing a product;
program instructions for the cognitive application to classify, using machine learning, each of the plurality of requirements using a neural parser trained to identify the requirements as either a business requirement or a technical requirement;
program instructions for the cognitive application to determine a hierarchy including a plurality of levels of business requirements and technical requirements from the requirement process document based on training of the cognitive application using ground truth information that comprises relationships between business requirements and technical requirements;
program instructions for the cognitive application to identify a particular level in the hierarchy for each of the business requirements and technical requirements and one or more relationships between the business requirement and the technical requirement within the hierarchy; and
program instructions for the cognitive application to identify a software component and associated capability for implementing one or more of the technical requirements.

* * * * *